Figure 1:
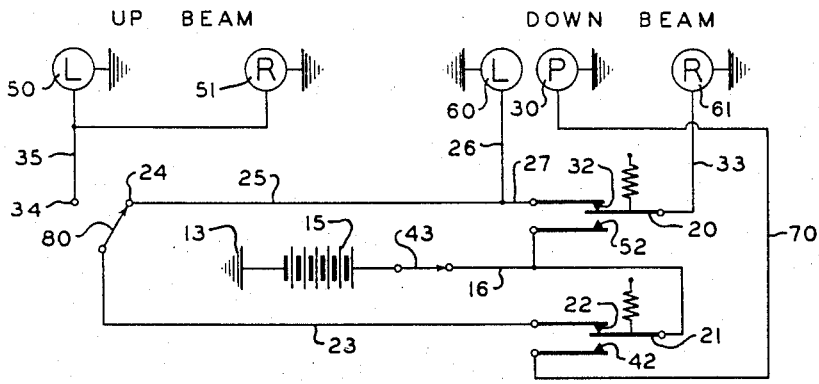

Jan. 3, 1950    D. S. GREY    2,493,192
ANTIGLARE HEADLIGHT SYSTEM FOR AUTOMOTIVE VEHICLES
COMPRISING SELECTIVELY ENERGIZED POLARIZING
AND NONPOLARIZING LIGHT SOURCES
Filed Oct. 10, 1946

INVENTOR
David S. Grey
BY
Donald L. Brown
and
Frank J. Novotny
Attorneys

Patented Jan. 3, 1950

2,493,192

UNITED STATES PATENT OFFICE 2,493,192

ANTIGLARE HEADLIGHT SYSTEM FOR AUTOMOTIVE VEHICLES COMPRISING SELECTIVELY ENERGIZED POLARIZING AND NONPOLARIZING LIGHT SOURCES

David S. Grey, Lexington, Mass., assignor to Polaroid Corporation, Cambridge, Mass., a corporation of Delaware Application October 10, 1946, Serial No. 702,472

3 Claims. (Cl. 88—1)

This invention relates to a polarizing headlight system utilizing at least one source of polarized light. More particularly, it embodies a conversion unit adapted for use as an auxiliary lighting source and designed primarily for use while passing oncoming cars.

In connection with the development of antiglare headlight systems for motor vehicles, one of the principal problems has been the development and design of equipment embracing polarized light sources for use in cars already on the road. Such systems utilizing polarized light in any of its well-known forms together with an appropriate visor and/or visors, whether manually or remotely controlled, form the specific subject matter of this disclosure.

In one of its broader aspects, the invention contemplates a source of polarized light comprising at least one such light source and automatic switching means effective upon positioning a cooperatively associated visor, preferably containing light-polarizing materials with the transmission axis suitably aligned, into operable position in the line of sight of the driver for de-energizing the original lighting system and energizing the modified lighting system including at least one polarized light source. Thus, the original lamps on the car would be left unchanged and an auxiliary unit, readily mounted on a bumper, cross bar or similar unit at the front of the car, is added thereto. It is, moreover, to be noted that circuits and lighting equipment wherein a completely polarizing lighting headlight system comprising one, two or more polarizing lighting elements are adapted by appropriate circuits and auxiliary apparatus to effect a complete change of lighting from nonpolarized lighting to polarized lighting during the passing period are not to be excluded.

It is a major object of this invention to make possible the rapid and easy conversion of both old and new cars utilizing ordinary headlights for road lighting purposes to the more efficient polarizing light units.

It is a further object hereof to effect this conversion without rendering the ordinary headlights inoperative.

Another object is to make possible an extremely effective polarizing light unit at a very low cost.

Still another object is to provide a polarizing light source which will not result in an excessive drain on the electric system of a car not originally designed to carry an additional electrical load.

These objects will become further clarified upon reading the following description of examples embodying this invention, and other and similar objects will suggest themselves to those versed in the related art.

Figure 2:
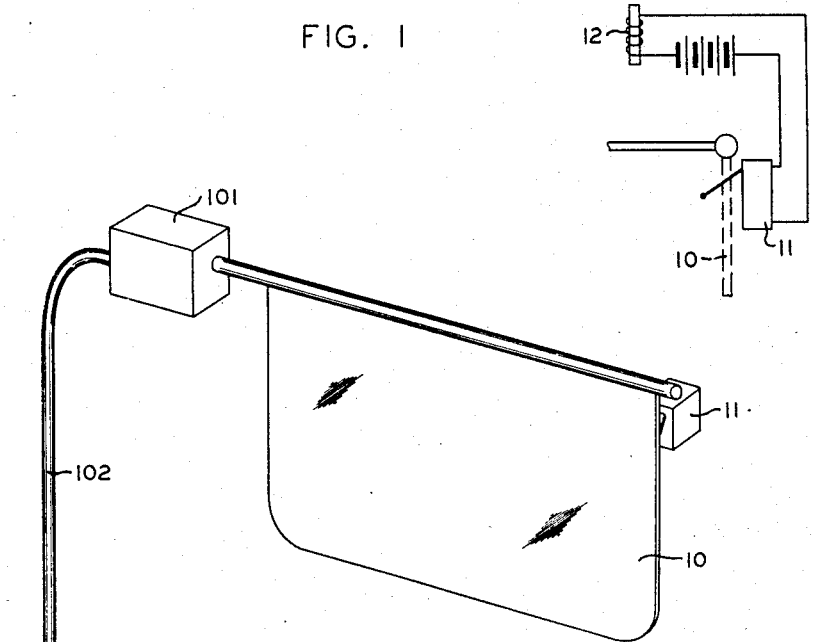

The improvements and advantages of the present invention are more readily appreciated when considered in conjunction with the appended drawings forming a part of this description in which:

Figure 1 is a wiring diagram, partly schematic, of a conversion unit connected for operation by raising and lowering the visor of a car; and Fig. 2 is a remotely controlled polarizing light system, operable by means of a foot switch or hand switch.

In general, any use of polarized light results in a diminution of light intensity by slightly more than 50%. This light loss, while not serious during the passing or meeting of cars, is serious during driving on the open road. With new equipment as provided in new cars, such reduction in road and object lighting is readily avoided by the utilization of headlight bulbs of increased wattage, heavier wiring to carry the higher lighting load, larger generators, and the like.

However, cars already on the road are not adapted for the ready installation of such high wattage systems, as may readily be ascertained by even a cursory examination of the electrical equipment now in use. Furthermore, for obvious reasons it is practically impossible to install larger generators in present day units due to the larger size of the more powerful units, lack of interchangeability of new parts, excessive cost of new equipment, etc. In addition, the excessive drain on an old or marginal storage battery results in shortening its useful life period.

Still another problem met in connection with the use of polarizing headlights has arisen from the fact that even though high wattage lamps are used in such systems as a source of illumination, approximately one-half of their effective illuminating power is cut out by the polarizing elements; and such inefficient operation of these light sources is continuously used even under conditions where headlight glare is not dangerous, as in city driving where street lights, store front lighting effects, electric signs and similar competing auxiliary light sources ameliorate, if not practically eliminate completely, the dangerous conditions accompanying headlight glare.

Heretofore, the systems suggested for the use of polarized headlights in lighting the road for moving and stationary vehicles have not been adapted to such divergent uses as those necessary for city, highway and traffic-passing driving conditions.

The present system gives additional flexibility to road lighting effects possible for new cars equipped therewith and, furthermore, will be found to yield highly desirable results when used in connection with lighting systems already found on old cars.

Referring, now, in more detail to the drawings, wherein corresponding numbers indicate similar operative elements in all the figures, 10, Fig. 1, is a polarizing visor which when swung into position intercepting a beam of light has its transmitting axis disposed at any one of a number of preferred positions, such as 45° to the left of vertical (i e. —45° system), —35°, —22½°, etc. The lowering of the visor 10 to its operative position simultaneously causes switch 11 to close a circuit for the energization of relay 12, which through its armatures 20, 21 completes circuits for the energization of at least one auxiliary polarizing light source 30 while simultaneously (or perhaps immediately prior thereto) de-energizing the ordinary or customary road lighting unit (i. e. up beam lights 50, 51 or down beam lights 60, 61, whichever happen to be in the energizing circuit determined by the usual foot switch 80).

It is thus obvious that with the present light-polarizing conversion system, a car equipped therewith is not deprived of the advantages found in the ordinary lighting systems as at present embodied in stock model cars. Moreover, by using (as in one embodiment disclosed) only one polarizing headlight, there need be no concern over excessive power demands and likewise over undue insulation hazards (a single 80–100 watt lamp at 30, Fig. 1 and heavy wiring 70 being the major parts of the extra equipment needed). Furthermore, a single 100 watt lamp is superior as a source of light to two fifty watt lamps, all things such as their design for equal life, etc., being considered. Then, if the conversion unit is designed and used primarily for passing only, there will be no excessive drain on the storage battery 15, even in the particular instance of a very old car.

The customary circuit for ordinary lighting systems (omitting intermediate relays for purposes of simplicity) is readily traced in Fig. 1, from ground 13 through battery 15, wire 16, lower armature 21 of relay 12, contact 22, wire 23, to foot switch 80. From this point a choice is given to up beam lights 50, 51 or to down beam lights 60, 61 back to ground. In the position shown, switch 80 engages with contact 24, to wire 25, which branches off to wire 26, to left down beam lamp 60, to ground; while wire 25 branches off to wire 27, to upper contact 32 of the upper armature 20 of relay 12, to wire 33, to right down beam lamp 61, to ground. Thus, with the visor in inoperative position and folded against the top of the car, the lighting system is in condition for ordinary operation, spring biased armatures 20 and 21 of relay 12 serving to complete circuits analogous to the conventional headlight energizing circuits found in stock model cars.

However, upon lowering visor 10, switch 11 closes a circuit shown for energizing relay 12 whereupon armature 21 engages contact 42, completing a circuit through wire 70 to energize polarizing left headlight 30; while armature 20 simultaneously makes contact 52, completing a circuit through wire 33 to energize ordinary right down beam lamp 61. This is the operative position when the driver of a car equipped with visor 10, polarized headlight, etc. (see Fig. 1) is driving with an opposing car's headlights glaring at him. Under such conditions, the visor 10 serves to cut off approximately 50 per cent. or more of the glare of the oncoming lights if they are ordinary lights and in up beam or down beam position, while if the approaching car is equipped with polarized headlights and visor 10 has its transmission axis crossed with the direction of vibration of the polarized light coming from the approaching car, the oncoming lights are reduced to pin points and no dangerous or blinding glare comes through to the driver of the car fitted with visor 10. At the same time, with a —45° system, the driver behind visor 10 has one hundred per cent. of the road light as illuminated by his own polarizing headlamp 30 transmitted through visor 10, the transmitting axis of which is likewise oriented at a —45° angle when in operative or down position. Moreover, polarizing headlight 30 being at least as bright as the ordinary up beam headlights will light up a portion of the road ahead at least equal to that illuminated by the up beam headlights and thereby give increased visibility without subjecting the driver of an oncoming car to a dangerous and blinding glare, particularly if the oncoming car is equipped with an appropriately oriented cross-polarizing visor.

With the system and wiring diagram shown in Fig. 1, even with switch 80 aligned so as to make contact 34 whereupon a circuit is completed under ordinary conditions through wire 35 to energize up beam headlights 50 and 51 to ground, the pulling down of visor 10 serves to break circuits, thereby de-energizing up beam lights 50, 51 and to complete circuits whereby polarizing headlight 30 and right down beam headlight 61 are energized. This is effected through appropriate circuits shown in the figures and described above and readily understandable by those versed in the art.

The modification shown in Fig. 2 is a further development of the visor and polarizing headlight system of Fig. 1, wherein a remote control device or servo mechanism is utilized to effect the placing of visor 10 into operative or inoperative position. Here foot switch 100 is operatively connected to cause vacuum operated plunger or piston device 101 to lower visor 10 upon one depression of foot switch 100, vacuum device 101 being adapted upon reaching the end of its piston stroke to stop and trip means for reversing the direction of motion of its piston upon again actuating foot switch 100. Similar trip means is provided at each end of the piston stroke of device 101 so that no hand manipulation of visor 10 is necessary. The remaining portions of the polarizing lighting system, bearing numerals similar to those shown in Fig. 1, are operated in a manner similar to that described above with respect to Fig. 1. Furthermore, an electric motor drive with automatic reversing means actuated by the visor's reaching its down or up terminal resting position is to be likewise deemed an equivalent to the vacuum operated remote control device, as is likewise any mechanically linked and foot operated device which similarly leaves the hands of the driver free for steering purposes while passing or meeting cars on the road and simultaneously lowering visor 10 and connecting up the polarizing lighting headlights. In any event one or more polarizing headlights may also be used and such systems are likewise to be considered as falling within the scope of this invention.

It is submitted that various other combinations of lighting elements are likewise possible and are all to be deemed as coming within the scope of this invention. Thus, for example, two polarizing headlights may be used in place of the one shown at 30, Fig. 1. In this particular embodiment the pair of polarizing headlights comprising a right and a left polarizing headlight could conveniently be mounted on the bumper or on a specially adapted cross bar.

Still other possible combinations are clearly within the scope of this disclosure and are readily suggested to those versed in the art upon cursorily examining the wiring diagram given in Fig. 1. Thus the system is readily adapted for the use of at least one polarizing headlight in combination with at least one up beam headlight by the mere substitution of the up beam headlights for the down beam headlights of Fig. 1. Such a system would provide illumination of the road for a greater distance in front of the driven vehicle as well as providing more intense illumination over a greater area than is possible with the down beam combination shown in Fig. 1.

In general, the direction of vibration of the polarized light projected by the polarizing headlight (i. e. 30, Fig. 1) or headlights and the direction or position of the transmission axis of the polarizing analyzer of visor 10 may be disposed at predetermined relative angular orientations. Thus, when disposed in parallel position with respect to these axes, one hundred per cent. of one's own polarizing headlight illumination is transmitted. This is the usual arrangement for a substantially −45° system, or for a +45° system; in the former system visor 10 has its axis of transmission oriented at an angle of 45° to the left of vertical, whereas in the latter system it is disposed an equal angle to the right of vertical.

In the specific case of a −35° system, the visor has its axis of transmission disposed at an angle of 35° to the left of vertical.

In certain cases it may be desirable to orient the axis of transmission of the visor 10 and the direction of vibration of the incident polarized light at certain angles different from those specified for the simple cases hitherto described. All such arrangements are deemed to fall within the scope of this invention. Thus, in the −35° system, although the axis of vibration of the polarized light coming from the polarizing headlights of an approaching car is disposed at an angle of 90° to the axis of transmission of one's own visor 10, Fig. 1, in order to effect extinction of these glaring headlights, the axis of vibration of one's own polarized light originating from one's own polarizing headlight 30, or headlights, is disposed at an angle of substantially 20° to the axis of transmission of one's own visor 10. In this manner approximately eighty per cent. or more of the polarized light originating from one's own polarizing headlight or headlights is available for use in observing the road or objects on the road ahead.

Furthermore, when used for piercing fog, it is found that a preferred orientation of axes embodies the alignment of the axis of transmission of visor 10 so as to be perpendicular to or crossed with the axis of vibration of the polarized light originating from one's own polarized lighting system. Such an orientation has been found to be highly effective for fog penetration. In brief, it is to be noted that under various other conditions, still other angular orientations of the respective axes, ranging from 0° up to and including 90°, may be found desirable, depending upon the specific use for which the combination of elements is to be employed and the specific benefits to be effected.

Thus, in certain cases it may be desirable to orient the respective axes of the polarizers and the analyzers at certain angles different from those specified in the simple cases hitherto described. All such arrangements are deemed to fall within the scope of this invention.

Moreover, since the polarized lighting system is intended principally for passing only, it is possible to use lamps designed to consume much more wattage or to burn the polarizing headlights at a much higher voltage and hence design such lamps for a shorter life than would be possible if these lights were to be used constantly. Also, with such a short period of use it is also to be deemed as coming within the scope of this invention to utilize two down beams with at least one polarizing headlight as may readily be effected by connecting wire 26, Fig. 1, with wire 33; likewise two up beams may be used with at least one polarizing headlight.

One advantage of having at least one up beam lamp (i. e. a polarized beam) always in operation is found in the resultant lighting up of the road for a greater distance in front of the driven vehicle, thereby facilitating the driver's viewing the road ahead for a greater distance.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In an automobile headlight system, in combination, a pair of nonpolarizing headlights, each of said headlights including means providing an up beam and means providing a down beam, at least one light-polarizing headlight, means for lighting said headlights, a light-polarizing viewing visor placeable in operative and in nonoperative positions, switching means for placing both said nonpolarizing headlights in circuit with said lighting means when said visor is in nonoperative position and for placing said light-polarizing headlight and one of said nonpolarizing headlights in circuit with said lighting means when said visor is in operative position, and means mechanically connecting said visor and said switching means whereby said switching means is actuated by movement of said visor between said operative and nonoperative positions.

2. In an automobile headlight system, in combination, a pair of nonpolarizing headlights, each of said headlights including means providing an up beam and means providing a down beam, at least one light-polarizing headlight, means for lighting said headlights, a light-polarizing viewing visor placeable in operative and in nonoperative positions, switching means for placing both said nonpolarizing headlights in circuit with said lighting means when said visor is in nonoperative position and for placing said light-polarizing headlight and one of said nonpolarizing headlights in circuit with said lighting means when said visor is in operative position, the down beam of the nonpolarizing headlight being energized when said light is in circuit with said light-polarizing headlight, and means mechanically connecting said visor and said switching means whereby said switching means is actuated by movement of said visor between said operative and nonoperative positions.

3. In an automobile headlight system, in combination, a pair of nonpolarizing headlights, each said headlight having means providing an up beam and means providing a down beam, a light-polarizing headlight, means for lighting all of said headlights, switching means for selectively placing said lighting means in circuit with said up beam providing means or said down beam providing means, a light-polarizing viewing visor placeable in operative and in nonoperative positions, supplemental switching means for de-energizing one of said nonpolarizing headlights and energizing said light-polarizing headlight and the down beam providing means of the other of said nonpolarizing headlights, and means mechanically connecting said visor and said supplemental switching means whereby said supplemental switching means is actuated by movement of said visor between said operative and nonoperative positions.

DAVID S. GREY.

REFERENCES CITED

The following references are of record in the file of this patent:

UNITED STATES PATENTS

| Number | Name | Date |
| --- | --- | --- |
| 1,786,518 | Chambers | Dec. 30, 1930 |
| 2,237,565 | Land | Apr. 8, 1941 |

FOREIGN PATENTS

| Number | Country | Date |
| --- | --- | --- |
| 243,686 | Great Britain | Oct. 15, 1925 |

OTHER REFERENCES

Chubb article in Transaction O. E. S., May 1937.